RADIO TELEPHONE SYSTEM

Filed Oct. 20, 1958 10 Sheets-Sheet 1

INVENTORS:
ROBERT F. HERRMAN
RICHARD H. MOEHLMANN
BY F. L. Styner
Att'ys.

INVENTORS:
ROBERT F. HERRMAN
RICHARD H. MOEHLMANN
BY
T. L. Styner
Att'ys.

INVENTORS:
ROBERT F. HERRMAN
RICHARD H. MOEHLMANN
BY
F. L. Styner
Att'ys.

INVENTORS:
ROBERT F. HERRMAN
RICHARD H. MOEHLMANN
BY
F. L. Styner
Attys.

INVENTORS:
ROBERT F. HERRMAN
RICHARD H. MOEHLMANN
BY
[signature]
Attys.

June 18, 1963 R. F. HERRMAN ETAL 3,094,661

RADIO TELEPHONE SYSTEM

Filed Oct. 20, 1958 10 Sheets-Sheet 6

INVENTORS:
ROBERT F. HERRMAN
RICHARD H. MOEHLMANN
BY
F. L. Styne
Att'ys.

RADIO TELEPHONE SYSTEM

INVENTORS:
ROBERT F. HERRMAN
RICHARD H. MOEHLMANN
BY
Attys.

INVENTORS:
ROBERT F. HERRMAN
RICHARD H. MOEHLMANN
BY
Att'ys.

June 18, 1963 R. F. HERRMAN ETAL 3,094,661

RADIO TELEPHONE SYSTEM

Filed Oct. 20, 1958 10 Sheets-Sheet 9

INVENTORS:
ROBERT F. HERRMAN
RICHARD H. MOEHLMANN
BY
T. L. Styner
ATTYS

INVENTOR.
ROBERT F. HERRMAN
RICHARD H. MOEHLMANN
BY
ATTORNEYS.

3,094,661

RADIO TELEPHONE SYSTEM

Robert F. Herrman and Richard H. Moehlmann, Rochester, N.Y., assignors to General Dynamics Corporation, Rochester, N.Y., a corporation of Delaware Filed Oct. 20, 1958, Ser. No. 768,411
7 Claims. (Cl. 325—55)

The present invention relates to radio telephone systems and it relates more particularly to a radio telephone system in which every station in the system may selectively call every other station in the system and which also enables each of the stations to simultaneously call all of the other stations.

Selective calling between stations in a telephone system requires the transmission of both control signals and intelligence carrying signals from the stations. Where at least a portion of the overall system comprises substantially conventional telephone wire facilities, the types of signals which may be transmitted for control purposes are appreciably limited and preferably such control signals should have a frequency within the portion of the audio band which is normally used by the telephone wire facilities. However, the system must include suitable apparatus for preventing mutual interference between the control signals and the intelligence carrying signals.

Therefore, a principal object of the present invention is to provide a new and improved telephone system.

Another object of the present invention is to provide a radio telephone system including new and improved means for enabling the selective communication between respective ones of the stations in the system.

Still another object of the present invention is to provide a new and improved method of providing selective calling in a telephone system.

A further object of the present invention is to provide selective calling in a radio system of the type having a relatively narrow response band.

Another object of the present invention is to provide a new and improved remote control system using control signals having frequencies within the audio band.

Another object of the present invention is to provide a telephone system in which audio control signals are employed without adversely affecting the transmission of audio frequency intelligence signals via the system.

Briefly, the above and further objects are realized in accordance with the present invention by providing a selective calling radio telephone system utilizing a phase-coded amplitude modulated control signal which is simultaneously transmitted with the voice signal to selectively maintain the called station or the called group of stations unsquelched. The coded control signal comprises one or more subcarrier waves which are modulated with a pair of low frequency signals bearing a predetermined phase relationship corresponding to the called station or group. The subcarrier wave or waves are located in the extreme upper portion of the pass band of the system and the low frequency modulating signals are located in the extreme lower portion of the pass band of the system so as to be passed by the system but readily separable from the voice signals which are simultaneously transmitted therewith.

Many other objects and advantages of the present invention will become apparent from a consideration of the following detailed description when taken in conjunction with the following drawings, in which:

FIG. 1 shows, in block diagram form, a radio telephone system embodying the present invention;

FIG. 2*a* and 2*b* are portions of a block diagram of the selective calling circuits of a radio telephone system embodying the present invention;

Figure 1:
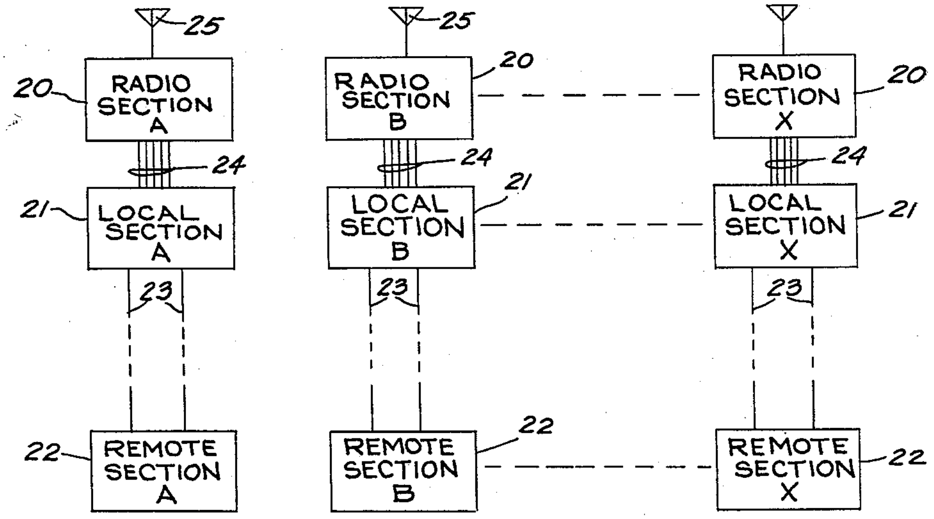

Referring now to the drawings, and particularly to FIG. 1 thereof, a radio telephone system comprises a plurality of radio stations respectively designated A, B . . . X, which each include a radio section 20, a local section 21 and a remote section 22. The particular distribution of the components at each station between the radio, local, and remote sections depends upon the manner in which the station in question is to be used and under certain circumstances the local section may be entirely eliminated. However, since a local section is ordinarily provided, the present invention is described as being embodied in a system using a local section in each station. In such a system, the local section 21 in each station is proximately disposed with respect to the radio section 20 and the remote section 22 is remote from the local section 21 and connected thereto by means of a pair of telephone lines 23 which convey electric signals having frequencies within a predetermined portion of the audio band between the local and remote sections 21 and 22. Assuming that the operator at the remote section 22 of station A desires to call, the operator at the remote section 22 of station A manipulates the necessary controls to develop an audio frequency control signal which is translated via the telephone lines 23 to the local section 21 from which it is connected by means of a suitable connector 24 to the radio section 20 wherein the audio control signals are modulated on a radio frequency carrier wave and transmitted in the form of an electromagnetic wave from an antenna system 25. This audio modulated radio wave is thus intercepted by the antenna systems of each of the stations in the system and coupled to the respective radio sections thereof. In the radio sections the modulated carrier waves are detected to provide the audio frequency control signals which are thence supplied to the associated local sections and from the local sections to the associated remote sections. Inasmuch as the control signals transmitted from the antenna 25 of station A were properly coded by the operator at the remote section 22 to selectively call the station X, these control signals are effective to render the remote section 22 of station X operative to reproduce the voice signals received by the associate antenna.

Figure 2A:
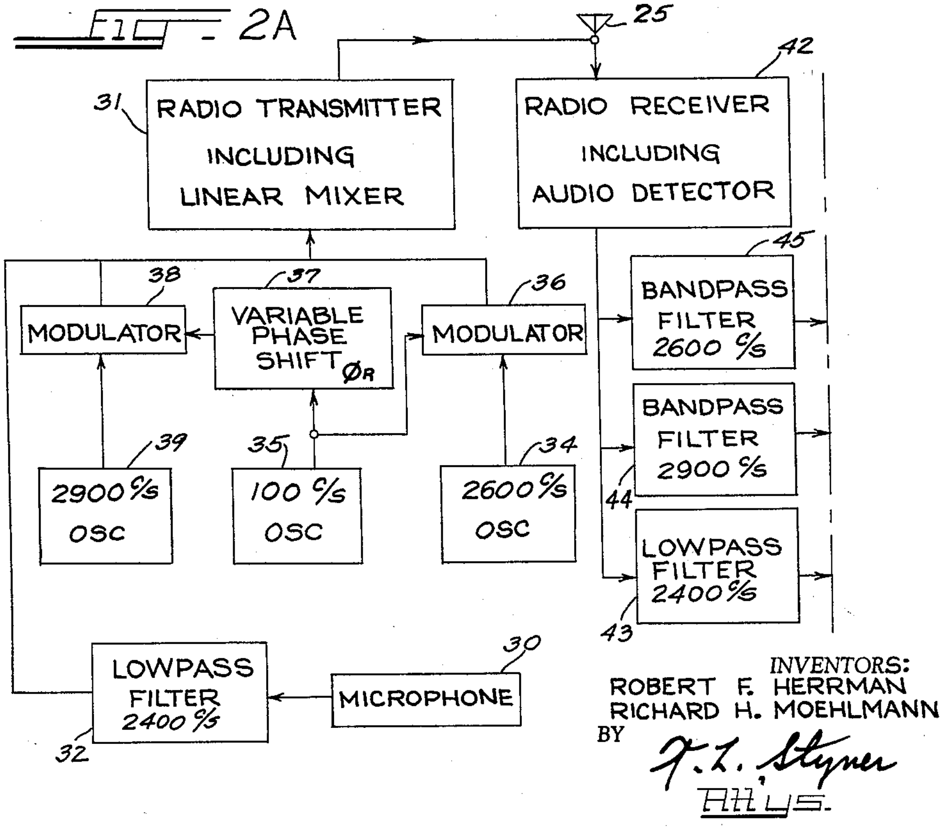
Figure 2B:
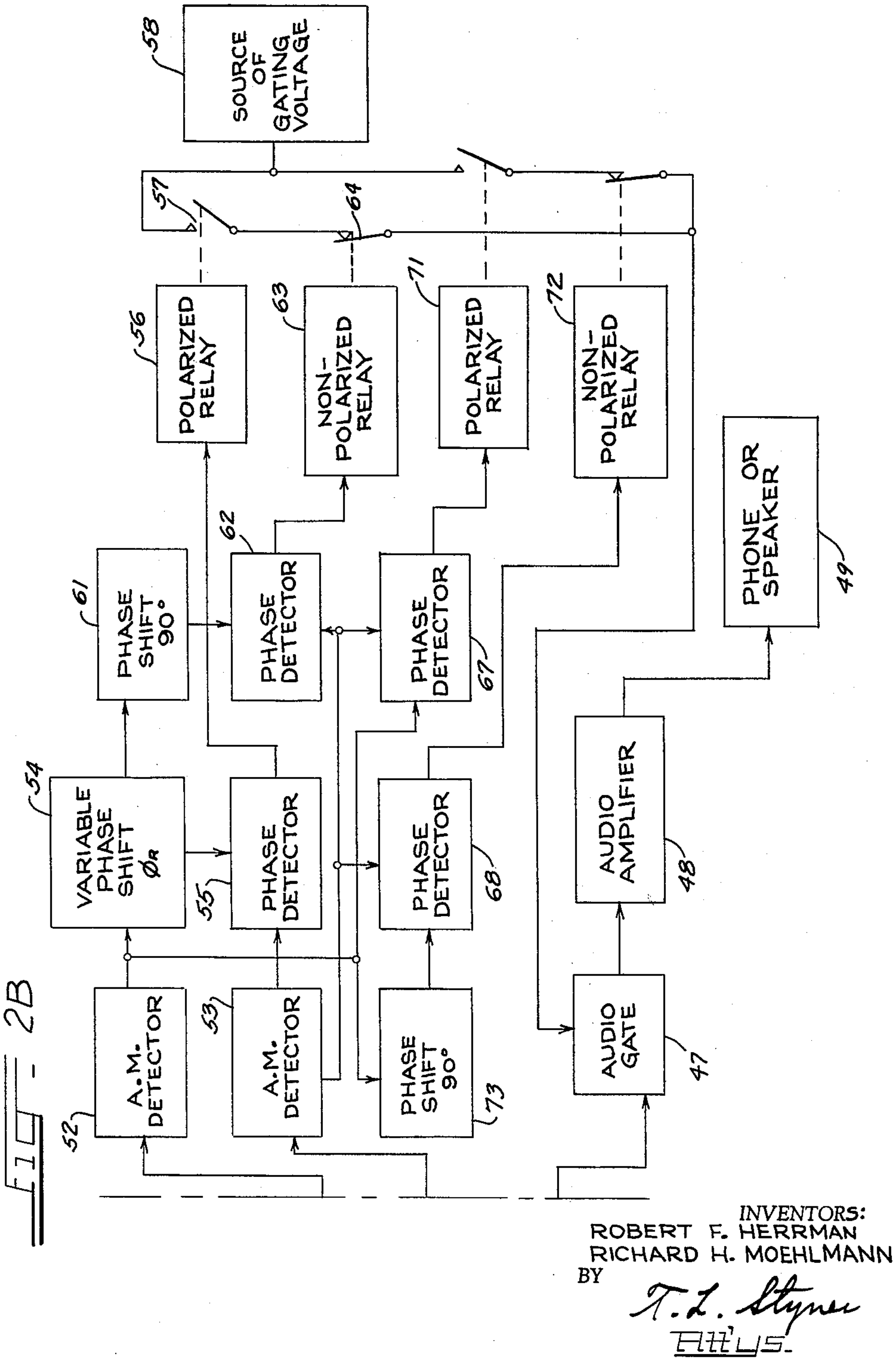

Referring now to FIGS. 2*a* and 2*b*, there is illustrated in block diagram form the principal components of station A which is substantially identical to every other station in the system. As there shown, a microphone 30 transduces the voice signals of an operator into electric signals having the corresponding frequency components for transmission through a low pass filter 32 to the mixer section of a radio transmitter 31. In the transmitter 31, the voice frequency components from the low pass filter 32 are modulated on a radio frequency carrier wave which is continuously transmitted from the antenna system 25 during a calling operation. All of the other radio telephone stations in the system receive this voice modulated carrier wave and detect it, but by virtue of the respective squelching circuits thereof the detected signals do not drive the phones or speakers in the remote sections of those stations. However, in order to enable the operator of a calling station to unsquelch the audio circuits at the remote section of the selectively called station, the radio frequency signal which is transmitted from the antenna system 25 also includes a control signal having audio frequency components modulated thereon, which components are properly coded so as to unsquelch the audio amplifier at the selected station. The coded control signal which is modulated on the carrier wave transmitted from the antenna system 25 comprises two audio frequency subcarriers which are respectively modulated by two audio signals of equal frequency. The frequency of the modulating signals is substantially less than that of the carrier wave.

As shown in FIG. 2, a 2600 cycles per second audio carrier wave from an oscillator 34 is mixed with a 100 cycle per second signal from an oscillator 35 in a mixer or modulator 36 whose modulated audio frequency carrier wave is then supplied to the radio transmitter 31 where it is mixed with a radio frequency carrier wave for broadcasting by the antenna system 25. The 100 cycle per second audio signal from the oscillator 35 is also supplied to a manually controlled variable phase shift oscillator 37 and thence to a modulator 38 where it is mixed with a 2900 cycle per second audio carrier wave from an audio oscillator 39. The 2900 cycle per second modulated carrier wave which thus appears in the output of the modulator 38 is coupled to the transmitter 31 where it is also mixed with the radio frequency carrier wave and thence supplied to the antenna system 25 for broadcasting. Accordingly, the electromagnetic waves which are transmitted from the antenna system 25 include a radio frequency carrier wave which is modulated with the voice frequencies from the microphone 30 and with the coded control signal which comprises the two audio modulated audio carrier waves from the modulators 36 and 38.

In making the selection of a particular station or group of stations with which the operator of station A wishes to converse, the operator adjusts the variable phase shift device 37 to provide that one of a plurality of predetermined phase angles which corresponds to the station or group of stations being called.

Assume now that contact has been made with the called station and that the called operator desires to talk with the calling operator. In a duplex system the called operator need only to talk into his microphone but in a simplex system he must first actuate a talk switch. In either case, the signal which is transmitted from the called station includes the voice frequencies of the operator and a control signal for unsquelching the audio circuits in station A, the calling station. The signal which is intercepted by the antenna system 25 at station A is coupled to a radio receiver 42 which includes an audio detector for separating the audio modulating frequencies from the audio modulated radio frequency carrier wave.

The audio frequency components of the received signal are then supplied to a network of three filters comprising a low pass filter 43, a bandpass filter 44, and another bandpass filter 45. The voice frequencies are contained in the audio spectrum below a frequency of 2400 cycles per second by virtue of the low pass filter 32 at the transmitter and are thus admitted by the low pass filter 43 to an audio gate circuit 47 which, if unsquelched, supplies them to an audio amplifier 48 which drives a phone or loud-speaker 49. The coded control signals are also included in the audio signal appearing at the output of the radio receiver 42 and include a carrier wave of 2600 cycles per second modulated with a 100 cycle per second signal and a carrier wave of 2900 cycles per second modulated with a signal of 100 cycles per second.

The modulated 2600 cycle per second carrier is passed by the bandpass filter 45 and supplied to an amplitude modulation detector 52 which develops a 100 cycle per second signal at the output terminals thereof. Similarly, the modulated 2900 cycle per second carrier wave is passed by the bandpass filter 44 and supplied to the input terminals of an amplitude detector 53 at the outputs of which a 100 cycle per second signal is developed. Because of the action of the variable phase shift device 37 in the called station, the 100 cycle per second signal which appears at the output of the A.M. detector 53 is displaced by a predetermined phase angle with respect to the output of the detector 52. Since the operator at station A initiated the call being described, when he adjusted the variable phase shift device 37 to select the phase angle which corresponds to the station or group of stations to be selected, he simultaneously adjusted a variable phase shift device 54 which may be the same device as 37 in a simple push-to-talk system or which may be separate from the device 37 in a duplex system. In either system, the variable phase shift device 54 is adjusted by the originating operator to the phase angle of the called station so that no selective calling by manipulation of the controls at the called station is necessary for the called operator to talk with the calling operator since the variable phase shift devices 37 and 54 in the called and calling stations are adjusted to the same phase angle. Accordingly, when the output signal from the variable phase shift device 54 is compared in a phase detector 55 with the output signal from the A.M. detector 53 the two signals are in phase correspondence and the output signal therefrom is used to operate a relay 56 to close a set of contacts 57 and supply a gating voltage from a source of gating voltage 58 to the audio gating circuit 47 thereby to unsquelch it and couple the voice frequency signal from the low pass filter 43 to the audio amplifier 48.

Assuming that the output of the phase detector 55 is a cosine function of the phase difference, the output signal will have a maximum positive value when the signals are in phase with one another but a substantially equal negative value when the signals are 180 degrees out of phase with one another. Therefore, in order to increase the number of stations or groups of stations which may be selectively called in a given system, it is desirable for the relay 56 to be polarized so that it is responsive only to signals of a predetermined polarity.

The number of phase shift increments used in this system, and thus the number of separate stations or groups of stations which can be called, is limited only by the ability of the system to provide and maintain accurate values of phase shift and to discriminate between the correct phase shift and adjacent increments. However, since the output of a phase detector is a function not only of the phase difference between the signals supplied thereto but also of the amplitudes of the signals supplied thereto, means must be provided to prevent a station from being unsquelched by a coding signal which has the incorrect phase shift but which is considerably stronger than the normal signal and means must also be provided for preventing a station from being unresponsive to a signal of very low amplitude which has the proper phase shift. Accordingly, the output signal from the variable phase shift device 54 is shifted 90 degrees by a phase shift device 61 and supplied to a phase detector 62 to which the output signal from the A.M. detector 53 is also supplied. The phase detector 62 is also a cosine detector and therefore operates in conjunction with the 90 degree phase shift device 61 as a sine detector to provide an output signal which is proportional to the sine of the phase angle between the signal supplied thereto as well as to the amplitudes of the signals supplied thereto. The output signal from the phase detector 62 is used to operate a non-polarized relay 63 which controls a set of normally closed contacts 64. If, therefore, the output of the phase detector 55 were sufficiently high to operate the polar relay 56 not because the phase shift introduced by the variable phase shift device 54 corresponded to that of the received signal but because of the excessively high amplitude of the received control signal, the output of the phase detector 62 would be sufficiently great to operate the relay 63 thereby to open the contact 64 and prevent the connecting of the gating voltage from the source 58 to the audio gating circuits 47 whereby the audio circuits of the receiver would remain squelched.

Figure 3:
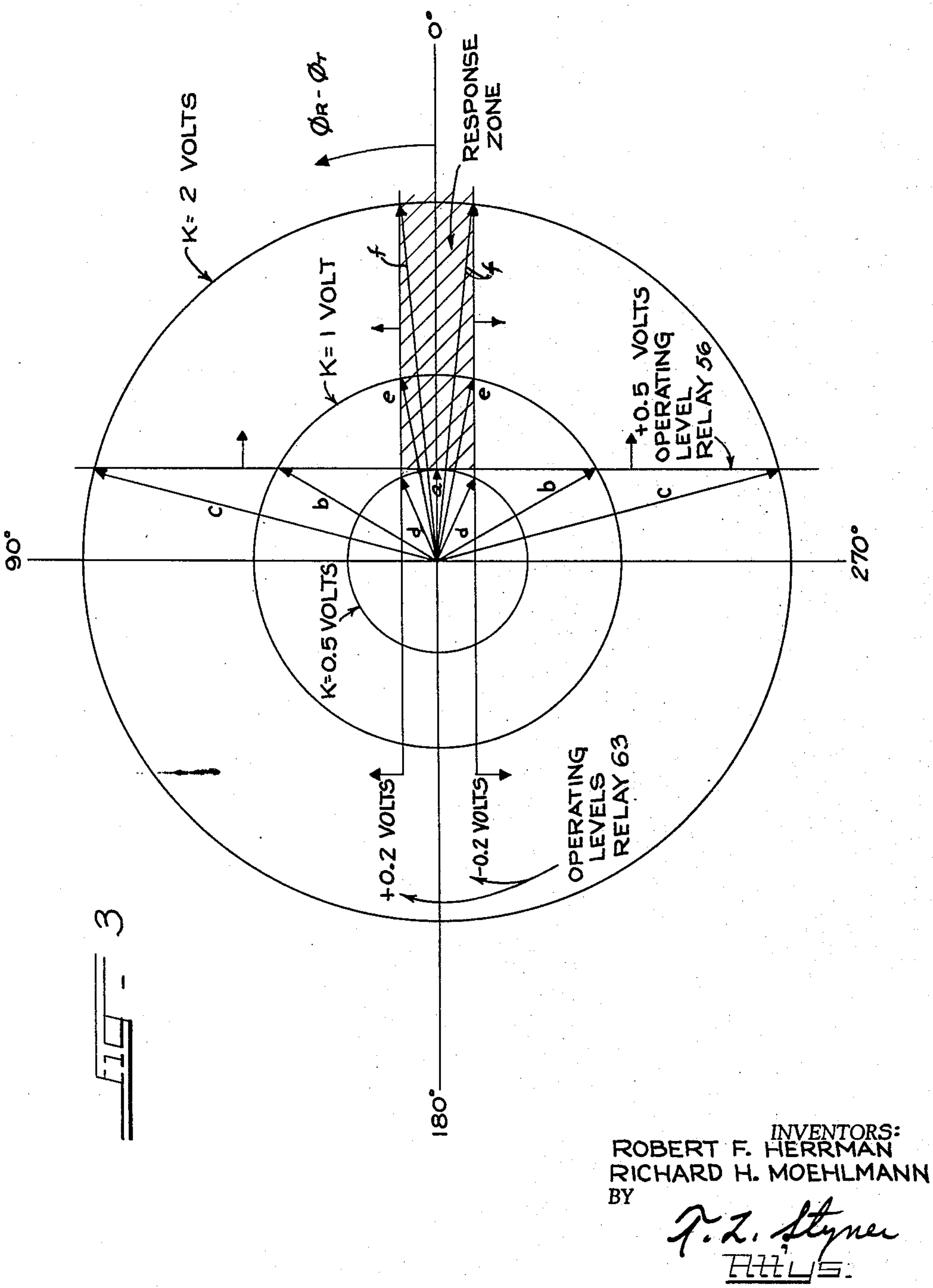
FIG. 3 is a vector diagram useful in understanding the operation of the selective squelching circuits of the present invention.

Referring to FIG. 3, there is shown a vector diagram which illustrates the additional degree of discrimination that the second phase detector 62 and the 90 degree phase shift device 61 provide under various conditions of applied signal amplitude variation. Assuming that in-phase signals of normal amplitude produce 1.0 volts at the phase detector ($k=1$ volt), the diagram shows that when the polar relay 56 is designed to operate on a phase detector output of 0.5 volt or more when a phase angle of 0 is provided between the signals supplied to the phase detector 55, a minimum output voltage of $k=0.5$ volt is required. However, for normal signals where $k=1$ volt and the additional detector is not employed, the relay 56 will operate and the audio circuits will be unsquelched for any phase angle between $+60$ and $-60$ degrees (vectors *b*), and for strong signals where $k=2$ volts the audio circuits will be unsquelched in response to signals having a phase difference between 0 and $\pm 76.5$ degrees (vectors *c*). It may thus be seen that unless precise control over the strength of the received signals is provided only a maximum of four stations could be included in the system without the strong possibility of stations in addition to the desired stations being selectively called.

By also including at each station the phase detector 62 and the associated phase shift device 61 and the additional relay 63, a considerably narrower response zone may be provided to substantially increase the number of stations or groups of stations which may be accommodated by the system. If the relay 63 is designed to operate on output voltages from the phase detector 62 which exceed 0.2 volt in magnitude, the response zone is narrowed down to $\pm 22$ degrees (vectors *d*). However, for a further increase in signal amplitude, the limiting action of the relay 63 commences and the maximum allowable phase angle for normal signal ($k=1.0$ volt) is $\pm 11.5$ degrees (vectors *e*) and for particularly strong signals ($k=2.0$ volts), the response zone is lessened to $\pm 5.7$ degrees (vectors *f*). Consequently, a system accommodating eight stations or groups of stations which may be selectively called can be accommodated using a phase increment of 45 degrees and without using highly accurate and expensive relays.

In order to enable every station to simultaneously call every other station, one of the phase shift increments is reserved for the "call-all" or as a command call. Therefore, when the signal transmitted from any station in the system comprises the "call-all" phase shifted control signal, it is imperative that the audio circuits of all stations be unsquelched irrespective of the adjustment of their respective variable phase shift devices 54. Therefore, an additional set of phase detectors 67 and 68 are provided for respectively operating a polarized relay 71 and a non-polarized relay 72. Preferably, the "call-all" phase increment is 0 degrees and therefore the detected audio signals from the A.M. detectors 52 and 53 are applied directly to the phase detector 67 for comparison so as to operate the polarized relay 71 when a phase match occurs. A 90-degree phase shift device 73 is interconnected between the output of the A.M. detector 52 and the phase detector 68 to which the output signal from the A.M. detector 53 is directly connected. Accordingly, the phase detector 68 and the phase shift device 73 effectively provide a sine detector which operates the non-polarized relay 72 when the output of the phase detector 68 exceeds a predetermined value. The phase detector 68 and the 90-degree phase shift device 73 are provided for preventing coupling of the gating voltage from the source 58 to the audio gate circuit 47 when the amplitude of the received signal is sufficiently high to operate the relay 71 even though the proper "call-all" phase shift is not present.

Referring now to FIGS. 4, 6, 7, 8 and 9, there is shown a schematic circuit diagram of the principal components of a radio telephone set or station employed in the system of the present invention. In FIGS. 6–9, there is shown the remote control section 22 and in FIG. 4 there is shown the local section 21 and the radio section 20. In the station thus illustrated in FIGS. 6–9, the coding and the decoding circuits are embodied in the remote section 22 and the local section 21 serves chiefly to relay control signals from the remote section to the radio set 20, and to interconnect the radio set 20 and the telephone lines 23 which connect to the remote section 24.

In this system, the local operator is able to hear all signals and noises appearing at the radio receiver output but he has no means of originating coded signals which must accompany his voice in order to squelch other radio receivers similarly equipped. The remote operator can select the code to be transmitted and received, disable the squelch circuit, generate a command code to call all stations, and by means of tone generators and resonant relay circuits, he can turn the radio set power on and off and key the transmitter. The remote operator cannot control the tuning of the radio set but the system includes intercom facilities between the local and remote sections so that the remote operator can request the local operator to tune the radio set to the desired frequency. If desired, of course, an additional remote section could be provided directly at the site of the local unit and the radio receiver so as to enable both the local and remote operators to have full control of the selective calling and squelch circuits.

Figure 4:
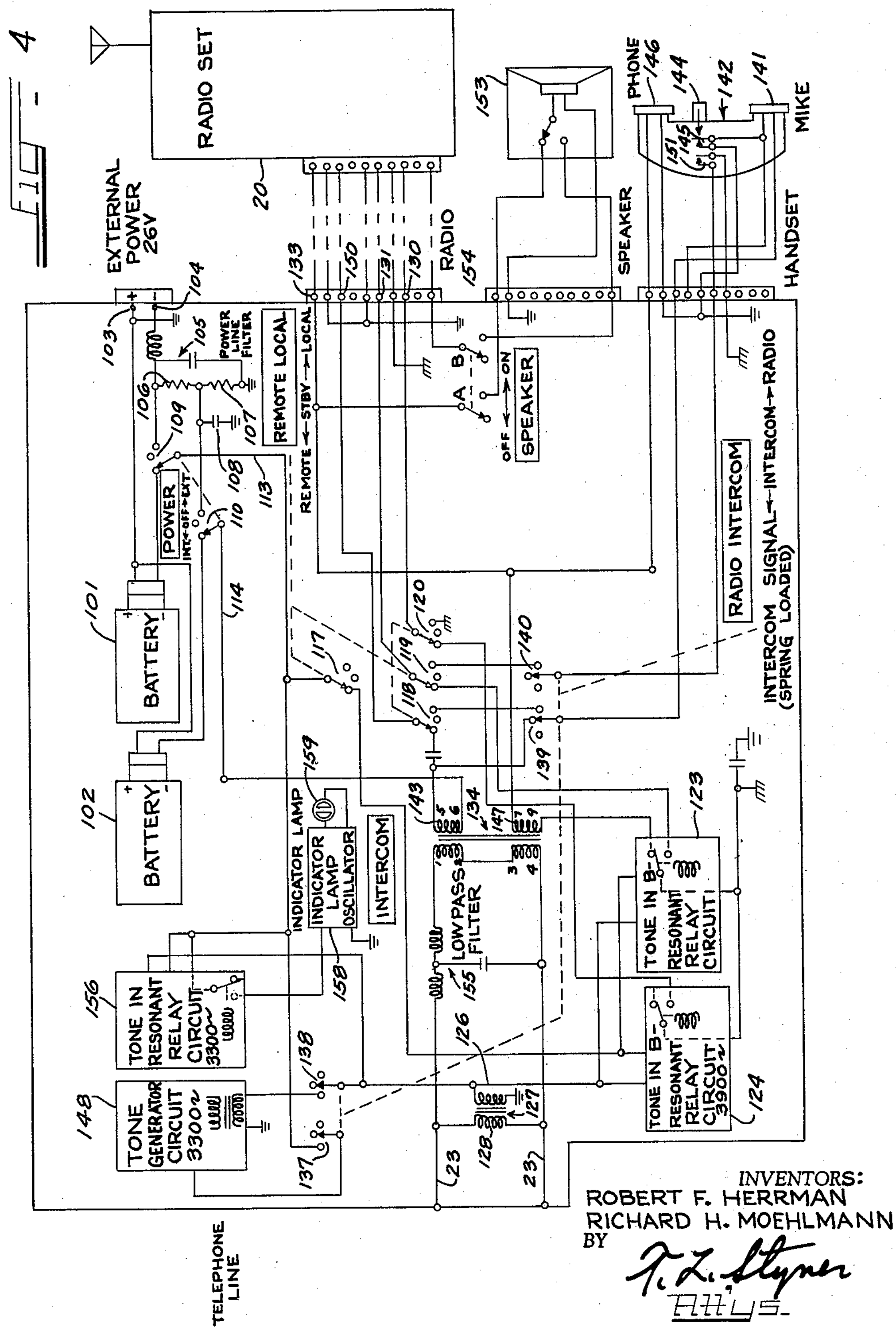
FIG. 4 is a schematic circuit diagram, partly in block diagram form, of the local unit of one of the stations in the system illustrated in FIG. 1.
Figure 5:
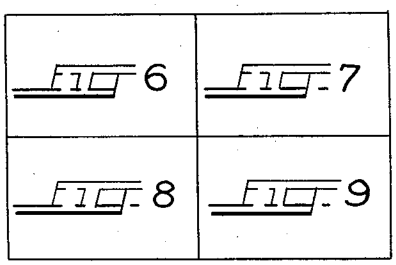
FIG. 5 is a view showing the manner in which FIGS. 6–9 should be assembled, to form a unitary circuit diagram for facilitating an understanding thereof.
Figure 10:
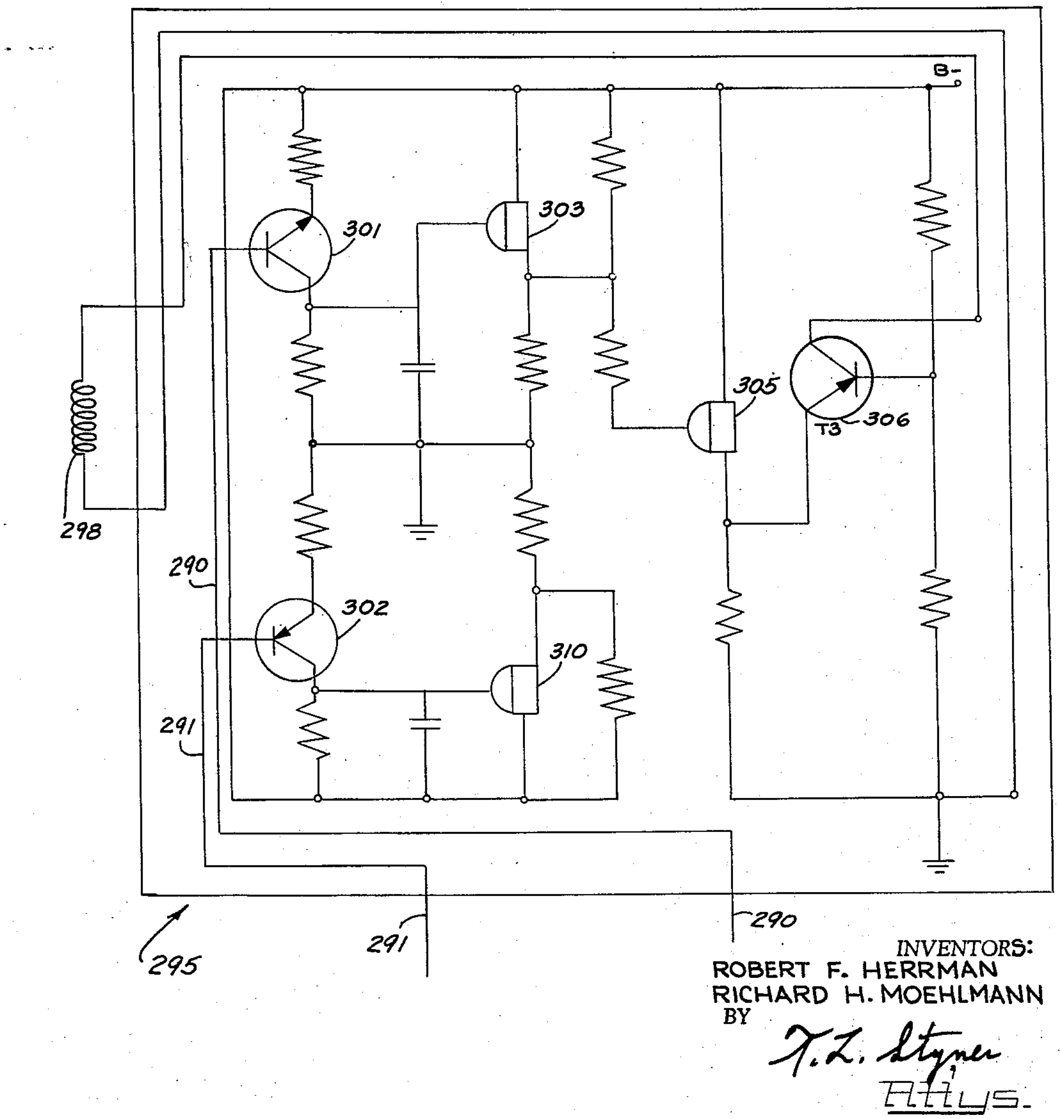
FIG. 10 is a schematic circuit diagram of a detector used in the portion of the remote unit shown in FIG. 8.
Figure 6:
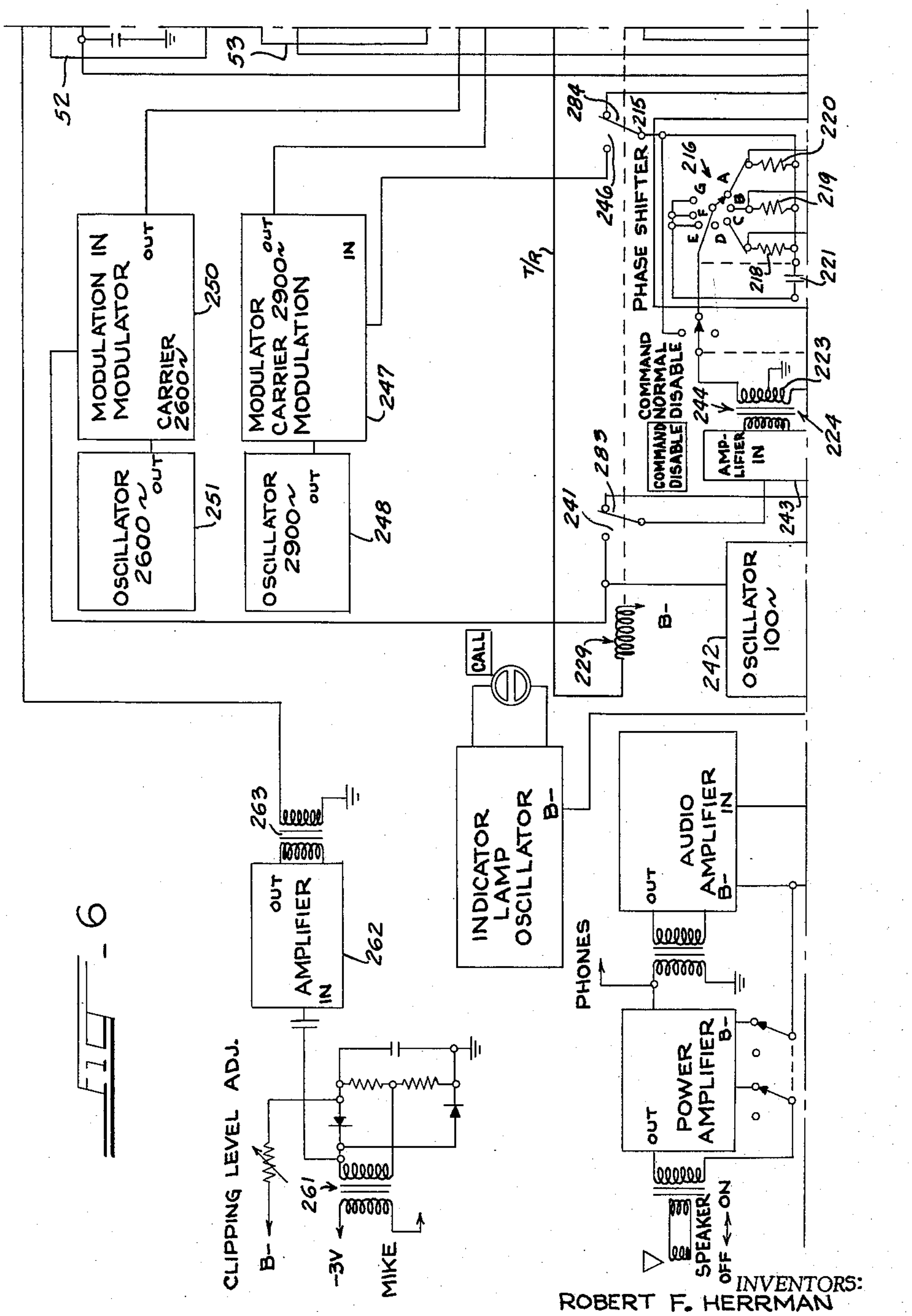
FIGS. 6–9 are parts of a schematic diagram of the remote unit of one of the stations in the system illustrated in FIG. 1.
Figure 7:
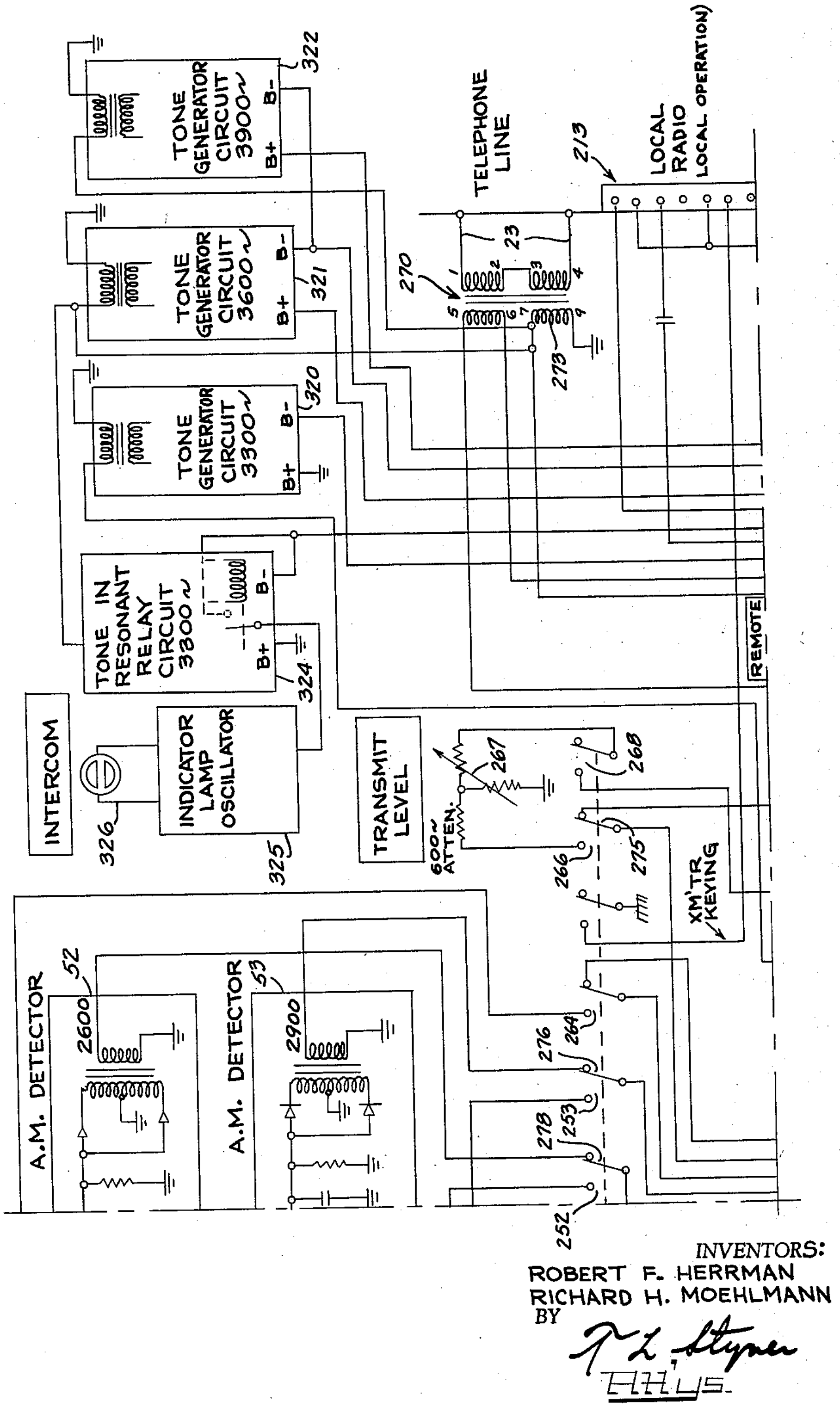
Figure 8:
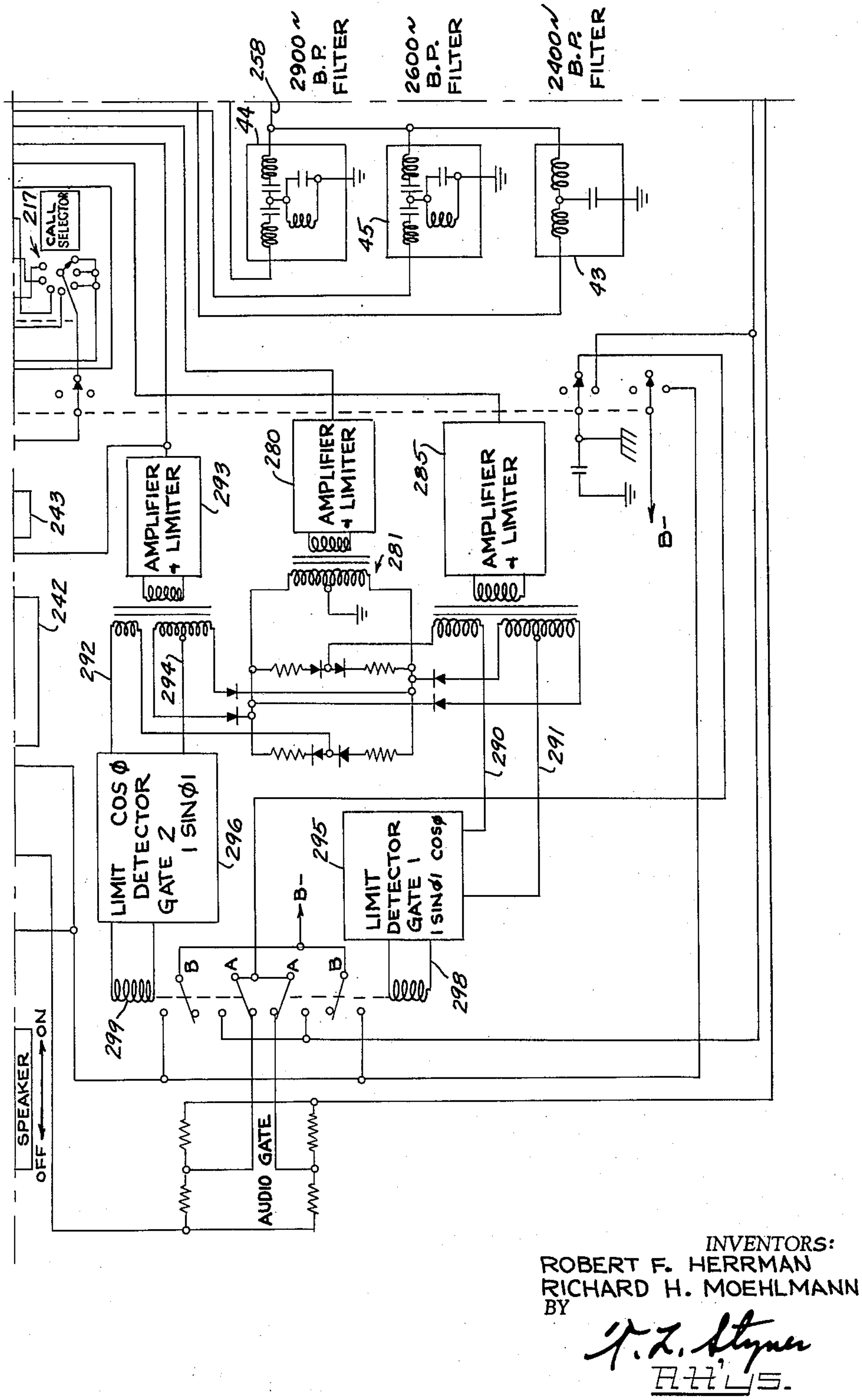
Figure 9:
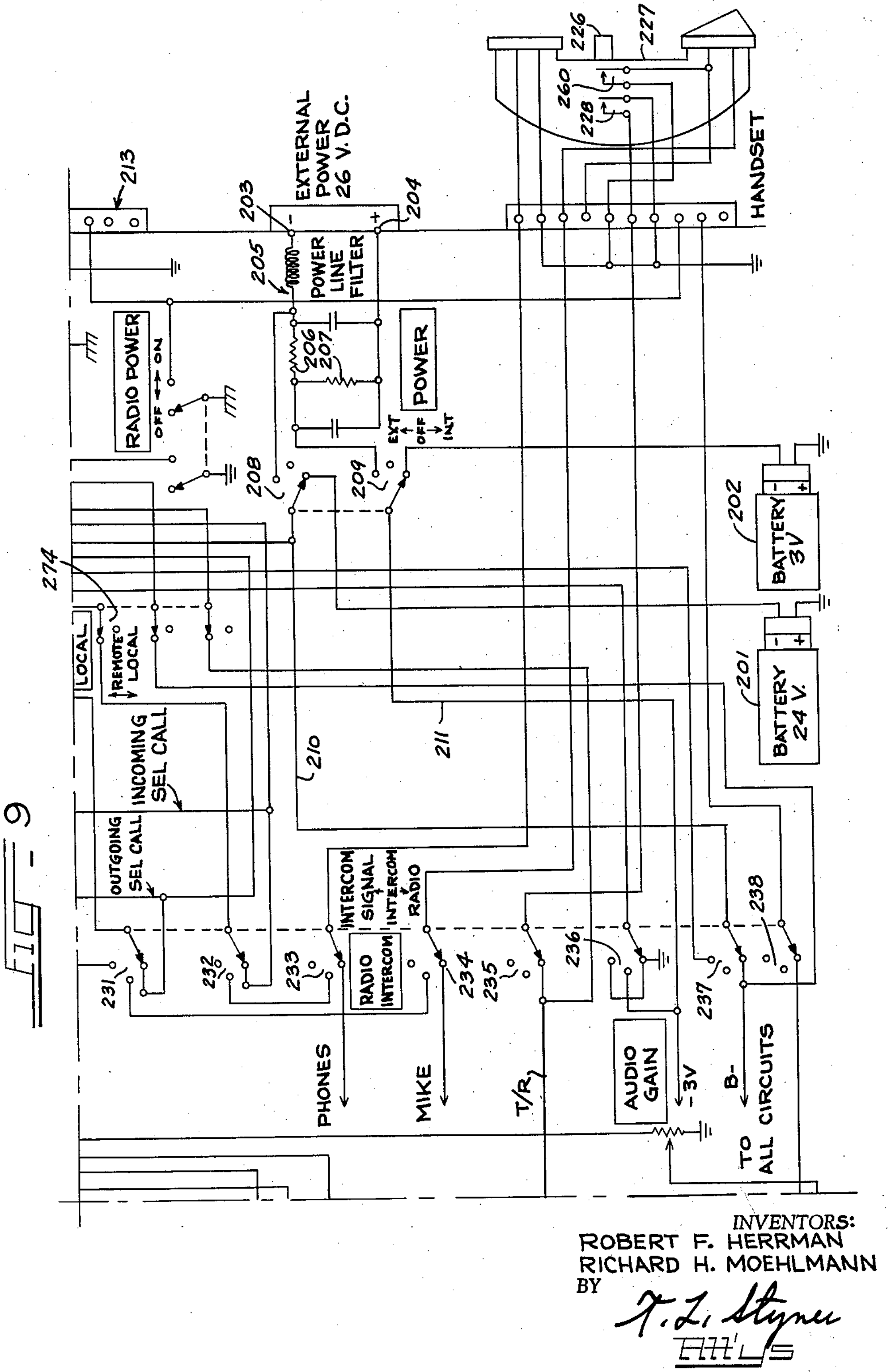

Referring now to FIG. 4, the local unit which is there shown is powered by a B+ battery 101 and an additional battery 102 of substantially lesser value for powering the microphone. The positive terminals of the batteries 101 and 102 are grounded and a pair of terminals 103 and 104 are made available to provide means for facilitating the energization of the local unit from an external source of power instead of from the batteries. An LC power line filter 105 is connected across the terminals 103 and 104 and a voltage divider comprising a pair of resistors 106 and 107 is also connected across the ouput of the filter 105 to develop across a capacitor 108 a lesser value of voltage corresponding to that provided by the battery 102. In order to enable the selective energization of the remote unit from either the local battery or from the external power lines, a pair of three-position switches 109 and 110 are ganged together and are respectively connected in the high and low voltage lines from the batteries 101 and 102 and from the external source of power. In the position shown, the B− voltage is provided on a conductor 113 from the battery 101 and microphone voltage is provided on a conductor 114 from the battery 102. When the switches 109 and 110 are thrown to the other extreme position, B− voltage is supplied to the conductor 113 from the external source of power connected between the terminals 103 and 104 and microphone voltage is supplied to the conductor 114 from across the capacitor 108. The local unit is deenergized when the switches 109 and 110 are in the center or "off" position.

The local unit may be operated in any one of three conditions: a remote condition, a local condition, and a stand-by condition. In the remote condition control of the station is effectively maintained by the remote operator. In the local condition the speaker and microphone of the local operator are directly connected to the radio set so that he may both transmit and receive radio signals but inasmuch as he cannot transmit the selective calling coded signal he is unable to unsquelch any station in the system which is equipped with the squelching circuit. In the stand-by position neither the remote operator nor local operator can key the transmitter but in this position the remote operator can call the local operator who can then adjust the local section so as to enable communication between the local and the remote operators.

In order to operate the local unit in a remote condition, a plurality of switches 117, 118, 119, and 120 which are ganged together for simultaneous operation are thrown to the extreme left-hand position as illustrated. Accordingly, a 3600 cycle per second resonant relay 123 and a 3900 cycle per second resonant relay 124 are serially connected with a winding 126 of the transformer 127 between ground and the B— line 113 so that when signals of 3600 cycles per second or 3900 cycles per second are impressed by the remote unit across the telephone lines 23 across which another winding 128 of the transformer 127 is connected, the corresponding ones of the relays 123 and 124 are energized. As indicated hereinbefore, in the remote condition of operation the remote operator controls the energization of the radio set 20 and he does this by impressing a 3900 cycle per second signal across the telephone lines 23. This 3900 cycle per second signal operates the relay 124 which connects a terminal 130 to ground. When the remote operator wishes to talk, he manipulates his controls so as to transmit a 3600-cycle tone over the line which actuates the resonant relay 123 to connect a terminal 131 on the radio set 20 to ground through switch 119. Operation of the relay 123 also opens the circuit between ground and a terminal 133 on the radio set 20 to prevent side tones which may appear at the audio output terminals 133 of the radio set 20 from being coupled through a transformer 134 to the hand-set at the remote unit where regenerative howling might result.

When the local operator and the remote operator wish to communicate with one another, the local unit is placed in the intercom condition by positioning a plurality of switches 137, 138, 139, and 140 in the center positions as shown. These switches are ganged together for simultaneous operation. When the switches 137–140 are in the intercom position, and a push-to-talk button 144 on the handset 142 is depressed to close a set of normally open contacts 145 thereof, the microphone 141 of the local handset 142 is serially connected with a winding 143 on the transformer 134 between ground and the microphone voltage line 114. Accordingly, the local operator may speak to the remote operator with the switches 137–140 in the intercom position. The remote operator may speak to the local operator at any time irrespective of the position of the radio intercom switches 137–140 except when the remote unit is transmitting the 3600 cycle per second signal indicating that the remote operator wishes to speak to an outside station. When, however, there is no 3600 cycle per second tone signal placed on the telephone lines 23 by the remote unit, the voice signal from the remote unit is coupled through the transformer 134 and supplied from a winding 147 thereof directly across the speaker portion 146 of the handset 142.

In order to enable the local operator to signal the remote operator that he wishes to talk with him, the local operator positions the switches 137–140 in the extreme left-hand position thereby to supply B— voltage from the line 113 through the switch 137 to a 3300 cycle per second tone generator 148 which impresses a 3300 cycle per second tone on the telephone lines 23 through the switch 138. Suitable facilities to be described more fully hereinafter are provided at the remote unit for responding to this 3300 cycle per second signal and for providing a suitable alarm. The switches 137–140 cannot be permanently placed in the intercom signal position since they are spring-loaded from that position toward the intercom position.

When the local operator wishes to communicate with other radio stations, he may position the switches 137–140 in the extreme right-hand or radio position and positions the switches 117–120 in the extreme right-hand or local position. Accordingly, the microphone in the handset 142 is connected between ground and a microphone input terminal 150 on the radio set 20 through the switches 139 and 118, and a set of normally open microphone contacts 151 in the handset 142 are connected between ground and the microphone control terminal 131 of the radio set 20 through the switches 140 and 119. The local operator may thus push the press-to-talk button 144 to close the microphone control contacts 151 when he wishes to key the transmitter to talk to one of the other stations in the system but in order to have these other stations or groups of stations unsquelched he must have first asked the remote operator to place the desired selective calling coded control signal on the telephone lines, or he could have asked the remote operator to broadcast a coded signal to the desired radio group asking them to disable their squelch circuits and stand by for an uncoded message.

In normal operation when the remote operator desires to broadcast to a selected station or group of stations, the switches 137–140 are placed in the extreme right-hand or radio position and the switches 117–120 are placed in the extreme lift-hand or remote position as illustrated, and therefore, the local operator may listen to the broadcasted signals through a speaker 153 by actuating a set of ganged speaker on-off switches to the extreme right-hand or "on" position.

The local unit includes an LC low pass filter 155 connected between the transformer 144 and the telephone lines 23 to prevent the control and signaling tones from the remote unit from entering the transmitter modulator of the radio set 20. In the disclosed system, the filter 155 has a cut-off frequency of 3100 cycles per second whereby the modulated coding signals from the remote unit are passed thereby but the control signals of 3300 cycles per second, 3600 cycles per second and 3900 cycles per second are not passed. In order to signal the local operator that the remote operator wishes to talk with him, a resonant relay 156 and associated circuit operating at a frequency of 3300 cycles per second are serially connected with the winding 126 between ground and the B— line 113 so as to be always conditioned for operation when the local unit is energized. Therefore, when a 3300 cycle per second intercom signal is placed on the line by the remote control operator, the relay 146 is operated to connect the B— line 113 to an indicator lamp oscillator 158 which energizes a neon glow tube type of indicator lamp 159.

Referring to FIGS. 6–9, the remote unit 22 which is there shown is self-powered by a B— battery 201 whose positive pole is connected to ground, and a microphone battery 202 of lesser value whose positive pole is also connected to ground. A set of terminals 203 and 204 are provided for enabling the remote unit 22 to be powered from an external source of voltage substantially equal to that of the battery 201, and an LC filter 205 and a potentiometer comprising a pair of resistors 206 and 207 are connected in parallel across the terminals 203 and 204. An external-internal pair of switches 208 and 209, which are ganged together for simultaneous operation, are provided for respectively energizing a B— voltage line 210 and a microphone voltage line 211 from either the batteries 201 and 202 or from an external source of power connected between the terminals 203 and 204. The switches 208 and 209 are shown in the internal position wherein the conductors 210 and 211 are energized from the batteries 201 and 202.

In order to enable the remote unit to be operated directly at the site of the radio exclusively of the local unit to which it is connected by the telephone lines 23, a suitable connector 213 is provided for direct connection to the corresponding connector on the radio set 20.

As described hereinbefore, a coded control signal is broadcast with the voice signal to the various stations in the system to unsquelch selected ones of these stations.

A phase shifter 215 is provided for this purpose and includes a pair of rotary switches 216 and 217 having the wipers thereof ganged together for simultaneous operation and which each includes seven contact positions for the selective connection of a plurality of resistors 218, 219, and 220 with a capacitor 221 across a center grounded winding 223 on a transformer 224. The remote operator adjusts the wipers of the switches 216 and 217 to provide the desired code for unsquelching a particular station or group of stations by proper adjustment of the wipers in the switches 216 and 217. With the phase shifter so adjusted, the remote operator presses a push-to-talk button switch 226 on his handset 227 to close a set of normally open microphone control contacts 228 which thus connect the low voltage side of the coil of a relay 229 to ground, the other end of the coil of the relay 229 being connected to the B— line 210. It will be noted that the coil of the relay 229 is energized through the normally open contacts 228 in the handset 227 when a set of switches 231–238 which are ganged together for simultaneous operation are in the fully down or radio position as illustrated. Therefore, with the switches 231–238 in the radio position, when the remote operator wishes to talk and thus effects a closure of the normally open contacts 228 in his handset, the relay 229 is operated to close a set of normally open contacts 241 thereof which connect the 100 cycle per second tone signal from an oscillator 242 to the input of an amplifier 243 which amplifies the 100 cycle per second signal and supplies it to a winding 244 of the transformer 224. The 100 cycle per second signal which is thus supplied to the phase shifter 215 is shifted by an amount dependent upon the ratio of the reactance of the capacitor 221 to a particular one or none of the resistors 218, 219, or 220 which is connected therewith and connected through a set of normally open contacts 246 of the relay 229 to the modulation input of modulator 247 to which the output of a 2900 cycle per second oscillator 248 is supplied. Accordingly, the output of the modulator 247 is a carrier wave of 2900 cycles per second modulated with a 100 cycle per second wave. The 100 cycle per second output voltage from the oscillator 242 is also coupled to the modulation input of an amplitude modulator 250 to which the output of a 2600 cycle per second oscillator 251 is also coupled. Accordingly, the output of the modulator 250 is a carrier wave of 2600 cycles per second modulated with a 100 cycle per second wave. The 100 cycle per second signals which are respectively modulated on the 2600 and 2900 cycle per second carrier waves are displaced in phase with respect to one another by an amount determined by the adjustment of the phase shifter 215. These modulated signals are then respectively coupled to respective sets of normally open contacts 252 and 253 of the relay 229 and coupled through a 2600 cycle per second bandpass filter 45 and a 2900 cycle per second bandpass filter 44 to a conductor 258. Transmission of the modulated signals through the bandpass filters eliminates undesired harmonies from the input to the radio. With the button 226 depressed, a set of normally open control contacts 260 in the handset 227 are also closed and, therefore, when the operator talks into the microphone the resulting electrical voice signal is coupled through the switch 224 to the primary winding of a transformer 261. The output of the transformer 261 is coupled to the input of an audio amplifier 262 which amplifies the voice signals which are coupled via a transformer 263 and a set of normally open contacts 264 on the relay 229 to a 2400 cycle per second low pass filter 43. The output of the low pass filter 43 is also connected to the conductor 258 so that the voice signals as well as the selective calling control signals from the filters 45 and 44 are superimposed on the conductor 258 from which they are coupled through a set of normally open contacts 266 on the relay 229 to an adjustable attenuator 267 by which their combined levels are adjusted to a desired value before they are coupled through a set of normally open contacts 268 and the switch 231 to a transformer 270 for coupling by the telephone lines 23 to the local unit from which they are impressed on the input of the modulator in the radio set 20.

When the remote unit 22 is in the receiving mode, the button 226 being released so that the contacts 228 and 260 are opened, the relay 229 is released. Accordingly, the audio signals which are impressed across the telephone line pair 23 by the local unit are supplied from across the secondary winding 273 of the transformer 270 through a switch 274, the switch 232, a set of normally closed contacts 275 on the relay 229 to the bandpass filters 45 and 44 and to the low pass filter 43. The 2900 cycle per second carrier wave and its 100 cycle per second modulation side bands are thus separated by the filter 44 and coupled through a set of normally closed contacts 276 on the relay 229 to an amplitude modulation detector 277. Similarly, the 2600 cycle per second carrier wave and its 100 cycle per second modulation side bands are separated by the filter 45 and coupled through a set of normally closed contacts 278 on the relay 229 to an amplitude modulation detector 52. Therefore, the output signals from the detectors 53 and 52 are 100 cycle per second signals, the signal from the detector 53, however, being phase shifted by an amount corresponding to that originally provided at the calling station. Accordingly, the output signal from the detector 52 is amplified in an amplifier 280 and applied to a cosine type phase detector 281 but the output from the detector 52 is coupled through a set of normally closed contacts 283 of the relay 229 and thus through the phase shifter 227 before being connected by a set of normally closed contacts 284 on the relay 229 to an amplifier 285. The phase shifted 100 cycle per second signal is thus amplified by the amplifier 285 and coupled to the detector 281 for comparison with the 100 cycle per second signal from the detector 53. The phase detector 281 is conventional and provides on a conductor 290 a D.C. signal which is proportional to the cosine of the phase angle between this 100 cycle signal supplied to the amplifier 280 and the 100 cycle signal supplied to the amplifier 285. Similarly, the detector 281 provides on the conductor 291 a D.C. voltage having a value which is substantially proportional to the sine of the phase angle between the signals supplied to the amplifiers 280 and 285. By virtue of the fact that the sine waves which are supplied to the amplifiers 280 and 285 are limited and substantial square waves are thus supplied to the detector 281, the waves of voltage appearing on the conductors 290 and 291 are not truly sinusoidal but more closely approach triangular waves having a maximum value, in the case of the cosine wave, when the phase angle is zero or 180 degrees and a maximum value in the case of the signal on the conductor 290 when the phase angle is 90 degrees or 270 degrees. Similarly, a D.C. signal proportional to the cosine of the phase angle between the 100 cycle signal developed at the detector 52 and amplified by an amplifier 293 and the 100 cycle signal developed at the detector 53 and amplified by the amplifier 280 is provided on the conductor 294 and is proportional to the absolute value of the sine of the phase angle between the signals from the detectors 52 and 53. The D.C. signals thus provided on the respective sets of conductors 290 and 291 and 290 and 294 are respectively supplied to limiter detector circuits 295 and 296. The limiters 295 and 296 function to operate respective relays 298 and 299 when both of the input signals to the respective limiters are zero. Consequently, the audio output of the receiver is grounded and squelched.

Since the gating circuits 295 and 296 are identical, only the circuit 295 is shown in detail. The conductor 290 is connected to the base of an NPN transistor 301 and the conductor 291 is connected to the base of a PNP junction transistor 302. When zero displacement between the signals supplied to the amplifiers 280 and 285 occurs, there will be substantially zero input to the transistor 302 and a large negative input signal to the transistor 301.

The transistor 301 is, as shown, connected in an emitter follower circuit whereby the input signal on the conductor 290 is coupled to the emitter of a switching diode 303 causing it to become nonconductive and thus raising its base-to-base resistance. This increase in resistance causes the voltage at the emitter of a switching diode 305 to become more positive and since the diode 305 is normally nonconductive it is forced into conduction by the low negative potential at its emitter, hence decreasing its base-to-base resistance. This decrease in the base-to-base resistance of the diode 305 causes a high negative potential to appear at the emitter of of a PNP junction transistor 306 causing it to be cut off and thus releasing the relay 298 to unsquelch the receiver. If the signals are too far out of phase, yet have sufficient amplitude that the resultant D.C. voltage is sufficient to trigger the aforementioned circuit, the squelching action then becomes amplitude dependent as well as phase dependent, which condition is undesirable. Accordingly, to countermand this occurrence, the input signal on the conductor 291 is a negative voltage equal to the absolute magnitude of the sine of the phase displacement between the signals supplied directly from the detector 53 and from the detector 52 through the phase shifter 37. By virtue of the conduction of the transistor 302 this negative voltage appears at the emitter of a switching diode 310 and thus supplies a high negative voltage to the diode clamping circuit including the diode 310. Since the clamping circuit output is always at the highest negative voltage available, the diode 310 remains nonconductive and the receiver remains squelched. It should be noted that by designing the circuits such that the relays 98 and 99 are normally energized in the squelch condition, relay failure merely causes the receiver to unsquelch and thus causes no interruption in the signal circuit.

In order to enable control of the operation of the station from the remote unit 22, a plurality of tone generators 320, 321, and 322 are provided. The signals from these generators thus operate the relays 123, 124, and 156 in the local section 21. Also, a resonant relay 324, which is responsive to a signal of 3300 cycles per second, is provided in the remote section for energizing an indicator lamp oscillator 325 which in turn energizes a lamp 326 when the local operator places the intercom signal of 3300 cycles per second on the telephone lines $L_1$, $L_2$.

Figure 11:
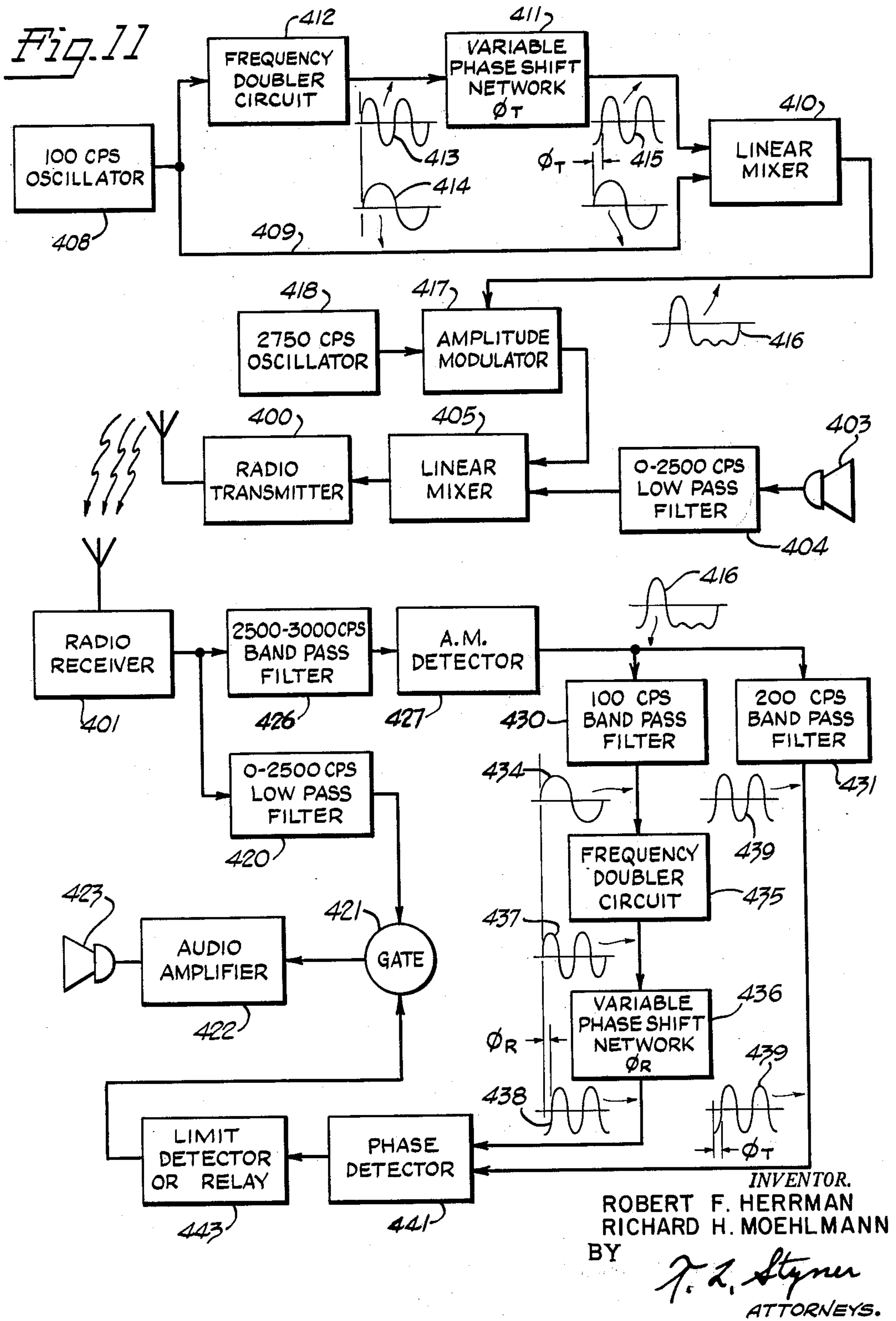
FIG. 11 is another system in block diagram form, embodying certain features of the present invention.

Referring now to FIG. 11, wherein is shown in block diagram form another radio communication system constructed in accordance with the present invention, each station in the system includes a radio transmitter 400 and a radio receiver 401, the transmitter 400 being used to transmit radio frequency carrier waves which are simultaneously modulated with a voice signal and a coded control signal, and the radio receiver 401 being used to receive similar radio frequency modulated signals from the other stations in the system and for demodulating the signals thus received to provide a composite output wave comprising the voice signal and the coded control signal. In this system, as in that described in connection with FIGS. 1–10, the control signals are transmitted in the upper portion of the audio pass band of the system so as to be readily separable from the voice signals which are simultaneously transmitted therewith in the lower portion of the audio pass band of the system.

As shown, the voice signal originates at each station in a suitable microphone type transducer 403 and is reduced in bandwidth by a low pass filter 404 before being applied to a linear mixer 405 which drives the transmitter 400. The coded control signal is also supplied to the mixer 405, and therefore, that radio frequency signal which is transmitted by the transmitter 400 includes voice signal modulation components and coded control signal modulation components.

In order to develop the coded control signals, there is provided at each of the stations a low frequency oscillator 408 having a very low frequency such, for example, as 100 cycles per second. The output voltage from the oscillator 408 is directly connected as by means of a conductor 409 to a linear mixer 410 wherein it is beat with a signal from a variable phase shift network 411. The 100 cycle per second voltage wave from the oscillator 408 is doubled in frequency in a frequency doubler circuit 412 before it is applied to the variable phase shift 411. Preferably, the low frequency doubler circuit is one which does not shift the phase of the signal which is applied thereto so that the cross-over points in the 200 cycle per second wave 413 appearing at the output thereof correspond in phase with the cross-over points of the 100 cycle per second wave 414 appearing on the conductor 409. The phase shift network 411 produces a phase shift indicated to be $\phi_T$ so that the output wave 415 thereof has cross-over points which are displaced by an angle $\phi_T$ from the cross-over points of the 100 cycle per second wave 414. The output wave 416 from the linear mixer 410 comprises the 100 cycle and 200 cycle signals and is supplied to one input of an amplitude modulator 417 wherein it is modulated on a subcarrier wave generated in an audio oscillator having a frequency of operation in the extreme upper portion of the audio pass band of the system. For example, the frequency of the oscillator 14 may be 2750 cycles per second and since the desired frequencies which are modulated thereon are no greater than 200 cycles per second, only a relatively small portion of the audio pass path of the system need be utilized for control purposes. Accordingly, relatively good fidelity may be provided.

The voice signal appearing in the detected output signal of the radio receiver 401 is separated from the control signal by means of a low pass filter 420 having a cut-off frequency of 2500 cycles per second and the output of the filter 420 is supplied through a control gate or switch 421 to an audio amplifier 422 which drives a loudspeaker or headset 23 with the audio voice signal. Preferably, the gate 421 is one which prevents the voice signals from being supplied to the amplifier 422 except when a control signal having the proper code is received. Therefore, in order to unsquelch the station so that the voice signal being received can be heard, the control signal which accompanies the voice signal in the detected output signal from the receiver 401 is connected through a bandpass filter 426 having a pass band of 2500–3000 cycles per second. Accordingly, only the control signal, namely the modulated subcarrier wave, passes through the filter 426 from which it is supplied to an amplitude modulation detector 427, the detected output signal of which is the wave 416 developed at the output of the linear mixer 410 in the calling station. This wave thus comprises a 100 cycle per second and 200 cycle per second signals which may be readily separated from one another by means of a pair of filters 430 and 431, the filter 430 being a 100 cycle per second tuned filter and the filter 431 being a 200 cycle per second tuned filter. Accordingly, the output of the filter 430 is a 100 cycle per second signal and the output of the filter 431 is a 200 cycle per second signal and the phase relationship between the cross-over points of these two signals is determined by the adjustment made in the phase shift network 411 at the calling station.

In order to readily detect this phase displacement, the output wave of the filter 430 which is designated 434 is supplied to a frequency doubler circuit 435 from which it is supplied to a variable phase shift network 436 having an adjustable phase shift designated $\phi_R$. As shown, the output wave from the frequency doubler circuit 435 is a wave of voltage 437 having cross-over points corresponding in phase to those of the wave 434, and the output wave 438 from the phase shift network 436 has cross-over points which are displaced from the wave 437 by a phase angle of $\phi_T$. When the phase shift network 436 is so adjusted that the phase shift $\phi_T$ is equal to the phase shift $\phi_R$ provided in the wave 439 appearing at the output of the 200 cycle per second wave 431, a phase detector 441 to which the waves 438 and 439 are supplied develops an output signal which operates a limit detector or relay 443 to trigger the gate 421 and thereby connect the voice signal from the filter 420 to the amplifier 422.

Preferably, the phase shift networks 436 and 411 are connected together for simultaneous adjustment and as in the system previously described in connection with FIGS. 1–10, certain ones of the same impedance elements may be used in both of the networks 411 and 436.

Although it would appear superfluous to employ these subcarrier waves in the present system since the 100 cycle per second wave and the phase shifted 200 cycle per second wave could be directly modulated on the radio frequency carrier wave, unless particularly good and expensive radio equipment is used, severe attenuation or distortion of the low frequency control signals would result. However, by using a subcarrier of substantially higher frequency the control signals are transmitted and received by the radio equipment in a portion of the audio band in which the transmission ratio and phase shift are quite constant, thus preserving the information conveyed by these signals.

The present system operates substantially the same as that described in connection with FIGS. 1–10, and, therefore, a further description of its operation is unnecessary.

While the invention has been described in connection with a particular embodiment thereof, it will be understood that various modifications may be made therein which are within the true spirit and scope of the invention as defined in the appended claims.

What is claimed as new and desired to be secured by Letters Patent of the United States is:

1. A radio communication system comprising a radio transmitter, including a source of carrier wave, a message signal source for modulating said carrier, a source of coded calling signals for simultaneously modulating said carrier, said coded signals including a first and a second undulating wave, means for shifting the phase of one of said undulatory waves with respect to the other, a plurality of receivers adapted to receive and demodulate the signals on said carrier, each of said receivers including means for separating the message signal from said coded signals, and means for separating the first from the second wave of the coded signals, a message reproducing device, a squelch circuit for normally disabling said reproducing device, a phase detector responsive to the waves of said coded signal for producing a distinctive output voltage when said first and second waves have a predetermined phase relationship, means for shifting the phase of said first wave a predetermined amount with respect to said second wave, the output of said phase detector being connected to said squelch circuit for enabling said reproducing device when a predetermined code signal is received.

2. A communication system comprising a transmitter, means for simultaneously transmitting via a signal link a band of intelligence signals and coded signals displaced in frequency from said band of intelligence signals, said coded signals comprising two separable signal components of like frequency, means for selectively adjusting the relative phase relationship between said two components; a plurality of remote receivers, said receivers each including means for detecting and reproducing said intelligence signal, a squelch circuit for normally disabling the signal reproducing means, and decoding means, said decoding means at each receiver being responsive to a different predetermined phase relationship between the two received separable signal components of like frequency and being connected to the associated squelch circuit for enabling the associated reproducing means only when separable components of predetermined phase relationhsip are received.

3. In the system set forth in claim 2, said coding signal means at said transmitter comprising two sources of subcarrier frequencies and a tone generator, said two sources being separately modulated by the output of said tone generator, and separate demodulators at each receiver for detecting and isolating the tone waves on said subcarriers.

4. In the system set forth in claim 3, the reproduced intelligence signal being disposed within a predetermined frequency band in the audio frequency spectrum, said sub-carrier waves having frequencies displaced above and adjacent said band, and said tone signals having a frequency slightly below said band.

5. In a radio communication system in which each one of a plurality of stations may be called by each of the others of said stations, the combination comprising at each station a radio frequency transmitter with a signal source and a carrier wave modulator, and a radio receiver with radio frequency demodulator and a signal reproducer, squelching means at each of said stations connected between said demodulator and reproducer for normally quieting said reproducer, means at each station for modulating said carrier and transmitting along with said intelligence signals two sub-carrier waves and means for modulating each of said sub-carrier waves with a code wave, and means for establishing any of a plurality of relative phase relationships between said two code waves, and means at each station for demodulating each subcarrier to derive the code signal on each, and means at each station responsive to a different phase relationship between said code signals for rendering inoperative the associated squelching means to render operative the reproducer.

6. In a selective calling communication system comprising a transmitter and a plurality of receivers, said transmitter including means to transmit to said receivers via a signal link a message signal and means to transmit to said receivers via said signal link a selective calling signal, the last-mentioned means comprising a fixed frequency wave generator means for separately transmitting via said signal link two components of the fixed frequency wave, phase shifting means at said transmitter for manually selectively shifting the phase of one component with respect to the other to any one of a plurality of predetermined phase values; said receivers each including means to receive via said signal link said message signal and the two separate components of said calling signal, a message signal reproducer, a squelch circuit for normally quieting said reproducer and means for disabling said squelch circuit when a predetermined calling signal is received, the disabling means including a phase shifter for shifting the phase of one received component a predetermined amount with respect to the other component, and a phase detector responsive to said two components for producing a characteristic output when components applied to the detector have a predetermined phase relation, and means for applying said characteristic output to said squelch circuit.

7. In combination in a communication system having a plurality of stations with a transmitter and a receiver at each station, means for selectively calling from one station any of the remaining stations, the transmitter at each station having means for transmitting a message signal and a coded calling signal, the coded calling signal including two simultaneous waves of like frequency, means for selectively fixing the phase angle relationship of said waves of like frequency, the receiver of each station each including a signal reproducer, a squelch circuit between each reproducer and its associated receiver detector for normally quieting said reproducer, means for disabling each squelch circuit to enable the associated reproducer, said disabling means comprising a phase shifter for shifting the phase of one code signal with respect to the other and a first phase detector for comparing the two code signals, means responsive to the amplitude of an output signal from said detector for selectively operating said squelch circuit, means for further phase shifting said one code 90 degrees with respect to the other, a second phase detector for comparing said other signal and said further phase shifted signal, and means responsive to the amplitude of the output of said second detector for selectively opening said squelch circuit whereby said squelch circuit is substantially immune to variations in the amplitudes of said pair of signals.

References Cited in the file of this patent

UNITED STATES PATENTS

| | | |
|---|---|---|
| 2,427,850 | Gehman | Sept. 23, 1947 |
| 2,479,338 | Gabrilovitch | Aug. 16, 1949 |
| 2,522,893 | Purington | Sept. 19, 1950 |
| 2,527,561 | Mayle | Oct. 31, 1950 |
| 2,591,937 | Herrick | Apr. 8, 1952 |
| 2,600,405 | Hoeppner | June 17, 1952 |
| 2,602,852 | Leuse et al. | July 8, 1952 |
| 2,709,218 | Gabrilovitch | May 24, 1955 |
| 2,743,361 | Bauman | Apr. 24, 1956 |
| 2,760,132 | Pawley | Aug. 21, 1956 |
| 2,761,062 | Wirkler | Aug. 28, 1956 |
| 2,858,425 | Gordon | Oct. 28, 1958 |
| 2,878,377 | Hargreaves | Mar. 17, 1959 |
| 3,007,042 | Schweitzer | Oct. 31, 1961 |